US012646632B2

(12) United States Patent
Davis et al.

(10) Patent No.: US 12,646,632 B2
(45) Date of Patent: Jun. 2, 2026

(54) ON THE DESIGN OF A COMPOSITE HYDRIDE-METAL TO ACCOMMODATE HYDRIDE DECOMPOSITION

(71) Applicant: Tokamak Energy Ltd., Abingdon (GB)

(72) Inventors: Thomas Davis, Didcot (GB); Simon Middleburgh, Chester (GB)

(73) Assignee: Tokamak Energy Ltd, Abingdon (GB)

(*) Notice: Subject to any disclaimer, the term of this patent is extended or adjusted under 35 U.S.C. 154(b) by 335 days.

(21) Appl. No.: 18/267,413

(22) PCT Filed: Nov. 30, 2021

(86) PCT No.: PCT/EP2021/083660
§ 371 (c)(1),
(2) Date: Jun. 14, 2023

(87) PCT Pub. No.: WO2022/128456
PCT Pub. Date: Jun. 23, 2022

(65) Prior Publication Data
US 2024/0055145 A1 Feb. 15, 2024

(30) Foreign Application Priority Data
Dec. 16, 2020 (GB) ..................................... 2019903

(51) Int. Cl.
*G21F 1/08* (2006.01)
*C22C 1/10* (2023.01)
(Continued)

(52) U.S. Cl.
CPC .................. *G21F 1/08* (2013.01); *C22C 1/10* (2013.01); *C22C 32/0089* (2013.01); *G21B 1/11* (2013.01); *G21C 11/02* (2013.01)

(58) Field of Classification Search
CPC ......... G21F 1/08; C22C 32/0089; C22C 1/10; G21B 1/11; G21C 11/02; B22F 1/145;
(Continued)

(56) References Cited

U.S. PATENT DOCUMENTS 2,961,359 A 11/1960 Lilli et al.
3,888,795 A 6/1975 Kasberg
(Continued)

FOREIGN PATENT DOCUMENTS

CN 101111766 A 1/2008
CN 104607650 A 5/2015
(Continued)

OTHER PUBLICATIONS

Hayashi ("Neutronics assessment of advanced shield materials using metal hydride and borohydride for fusion reactors") Fusion Engineering and Design 81 (2006) 1285-1290 (Year: 2006).*
(Continued)

*Primary Examiner* — Angelo Trivisonno
(74) *Attorney, Agent, or Firm* — Michael Best & Friedrich LLP

(57) ABSTRACT

Neutron shielding comprising a metal-hydride metal composite: the metal-hydride metal composite comprising: a metal matrix; and a plurality of metal-hydride particles dispersed within the metal matrix; wherein, the fraction of metal-hydride in the metal-hydride metal composite is at least 1 mol % and the volume fraction of metal-hydride in the metal hydride metal composite is no higher than the ratio of the solid solubility limit of hydrogen in the metal matrix and the molar fraction of hydrogen in the metal-hydride.

20 Claims, 5 Drawing Sheets

(51) Int. Cl.

| | |
|---|---|
| ***C22C 32/00*** | (2006.01) |
| *G21B 1/11* | (2006.01) |
| *G21C 11/02* | (2006.01) |

(58) Field of Classification Search

CPC .. B22F 2998/00; B22F 2999/00; Y02E 30/10; Y02P 10/25; B33Y 10/00; B33Y 80/00

See application file for complete search history.

(56) References Cited

U.S. PATENT DOCUMENTS

| | | | | |
|---|---|---|---|---|
| 5,887,042 | A | 3/1999 | Akamatsu et al. | |
| 2010/0123107 | A1* | 5/2010 | Johnson ................. | G21C 3/623 252/636 |
| 2018/0214949 | A1 | 8/2018 | Martin et al. | |
| 2019/0085435 | A1* | 3/2019 | Martin ...................... | B22F 1/16 |
| 2020/0176132 | A1 | 6/2020 | Kingham et al. | |
| 2023/0132031 | A1* | 4/2023 | Snead ....................... | G21F 1/08 376/347 |

FOREIGN PATENT DOCUMENTS

| | | | |
|---|---|---|---|
| CN | 105734346 | A | 7/2016 |
| CN | 109913680 | A | 6/2019 |
| CN | 109996625 | A | 7/2019 |
| CN | 110499441 | A | 11/2019 |
| CN | 111020302 | A | 4/2020 |
| CN | 111968769 | A | 11/2020 |
| DE | 2116261 | A1 | 10/1972 |
| EP | 0119781 | A1 | 9/1984 |
| WO | 2009047011 | A1 | 4/2009 |
| WO | 2018/232512 | A1 | 12/2018 |

OTHER PUBLICATIONS

Great Britain Patent Office Action for Related Application No. GB2019903.0 dated Mar. 9, 2021 (5 pages).

International Search Report and Written Opinion for Related Application No. PCT/EP2021/083660 dated Mar. 17, 2022 (26 pages).

International Preliminary Report on Patentability for Related Application No. PCT/EP2021/083660 dated Mar. 15, 2023 (14 pages).

Goodall R. : "Data of the maximum solid solubility limits of binary systems of elements", Data in Brief, [Online] vol. 26, Oct. 1, 2019 (Oct. 1, 2019), p. 104515, XP055897031, ISSN: 2352-3409, DOI: 10.1016/j.dib.2019.104515 Internet Retrieved from the Internet: URL:https://reader.elsevier.com/reader/sd/ pii/S2352340919308704?token=C9E0240D4206CA 9BE9FEA5A28C7A4D016446A50666 CFCC13A065B06AE7BD60294E2EB66A218FF1BI65AD23F082 76272A&o riginRegion=eu-west-I&originCreation=20220 302172756>.

Shen et al., Materials Herald, Issue S2, ""Metallic hydrogenin chemical sub-screen Applied research Study the current situation"", Nov. 25, 2019.

Wang et al, Atomic Energy Science and Technology, Issue 10, ""Metallic hydrogenchemical in small sodium cold fast reactor shielding device planned application"", Oct. 20, 2016.

Chinese Patent Office Action for Application No. 202180093840.5 dated Jan. 17, 2024 (11 pages with english translation).

* cited by examiner

ON THE DESIGN OF A COMPOSITE HYDRIDE-METAL TO ACCOMMODATE HYDRIDE DECOMPOSITION

CROSS-REFERENCE TO RELATED APPLICATION(S)

This application is a national phase entry of PCT/EP2021/083660, filed on Nov. 30, 2021, which claims priority to GB 2019903.0, filed on Dec. 16, 2020, the entire contents of each of which are incorporated herein by reference.

FIELD OF INVENTION

The present invention relates to a neutron shielding material (here "neutron shielding") comprising a metal-hydride metal composite incorporating a metal matrix. The metal matrix is operative to dissolve hydrogen released from a metal-hydride during dissolution.

BACKGROUND OF THE INVENTION

Conventionally, the presence of hydrogen in metal-based alloys used, for example, as neutron shielding poses a challenge. This is because, more often than not, hydrogen is soluble in metals and capable of forming metal hydride phases. In either form, the hydrogen leads to embrittlement of the alloy, which is detrimental to mechanical performance. The embrittling effect of the hydride precipitates is a particular concern because their formation is often coupled with a volume change, which in turn can lead to microscopic or macroscopic fractures or pulverisation of the alloy. For this reason, the formation and presence of hydrides in metal-based alloys is normally avoided.

However, in melt processing or as a result of component operation, the presence or ingress of hydrogen may be unavoidable.

U.S. Pat. No. 6,192,098B1 discloses a hydride resistant nuclear fuel rod to inhibit hydride formation in the inner portion of the rod using a graded oxygen profile.

U.S. Pat. No. 4,659,545A discloses a zirconium-based fuel rod with a thin film of nickel disposed on its surface. The nickel provides multiple sites for hydride transport from the interior of the fuel rod, thus preventing the formation of hydrogen blisters.

In an operating environment, the alloy may be exposed to transient heating. Above a critical temperature, metal hydrides dissolve or dissociate. When in solution, a common problem is that hydrogen, being the smallest element, often diffuses readily in metals and the dissolution process can be rapid. If the flux of hydrogen is sufficiently large, the dissolution may lead to the formation of hydrogen gas and/or re-precipitation of hydrides. For example, in cooler regions of the material. In some scenarios, hydrogen gas may even be released from the alloy, or form blisters. Hydrogen gas is extremely explosive. The release of hydrogen from alloys, during these transient heating events, therefore poses an unacceptable safety hazard. The hydrogen gas may also react with other materials in the system, such as structural elements, and lead to the formation of metal hydrides, which degrades the structure.

In a nuclear system, hydrogen is a good neutron moderating material and the reduction of moderation will lead to a reduction in shielding of components (if used as a component of a neutron shield) or lead to a reduction in nuclear reactivity (if used as a fuel moderator). Metal hydrides may provide compact moderating materials for space nuclear reactors, micro nuclear reactors or marine-based nuclear reactors.

There is therefore a need for an alloy design which is adapted to contain the release of hydrogen.

SUMMARY OF THE INVENTION

It is an object of the present invention to provide a new and useful neutron shielding comprising a metal-hydride metal composite.

In general terms, a first aspect of the invention proposes a neutron shielding material (herein neutron shielding) comprising a metal-hydride metal composite. The metal-hydride metal composite comprises a metal matrix and a plurality of metal-hydride particles dispersed within the metal matrix. In a transient heating event, the metal-hydride particles may decompose and release hydrogen. The metal matrix acts as a reservoir to store the released hydrogen. As the metal-hydride decomposes, metal which had formed the hydride, is left in its place. These residual metal "islands" also store the released hydrogen. The volume fraction of metal matrix in the composite, which comprises the neutron shielding, is engineered to be sufficiently high such that hydrogen released during decomposition is dissolved without release of hydrogen gas. That is, the volume fraction of metal-hydride in the metal-hydride metal composite is no higher than the ratio of the solid solubility limit of hydrogen in the metal matrix and the molar fraction of hydrogen in the metal-hydride. The neutron shielding is therefore operative to dissolve hydrogen released during dissolution events.

The volume fraction of metal-hydride particles in the composite and the dispersion of the hydrides is larger than that of trace amounts of hydrides found in commonplace alloys, which, may result from hydrogen ingress during manufacturing. For example, the fraction of metal-hydride in the metal-hydride metal composite may be at least 1 mol %.

In some examples, hydrogen may already be dissolved in solid solution within the matrix before the metal-hydride particles decompose. The metal matrix is then a "shallower" reservoir because the solid solubility sets the "depth" or molar quantity of hydrogen that can be dissolved within the matrix at a given temperature. Correspondingly, to avoid hydrogen evolution, the volume fraction of the matrix comprising the composite may be made larger. That is, the volume fraction of metal hydride may be made no higher than the ratio of: the difference between the solid solubility limit of hydrogen in the metal matrix and the average hydrogen molar concentration in the metal matrix; and the difference between the molar concentration of hydrogen in the metal-hydride particle and the average hydrogen molar concentration in the metal matrix.

To function as a particularly effective neutron shield, the volume fraction of the metal hydride in the metal composite, which is the component that moderates the neutrons, may be larger than 5%.

In the neutron shielding, the metal constituent in the metal hydride particles and metal matrix may be the same or different. For example, the metal in the hydride particles and metal matrix may be Zirconium. In another example, the metal in the hydride particles may be Zirconium and the metal in the matrix may be Titanium.

If the metal constituent in the metal hydride particle and metal matrix are different, the solid solubility limit of each may also differ. For example, the metal constituent in the metal hydride may have a very low solid solubility for hydrogen compared to metal constituent in the metal matrix. Then, the hydrogen may be mainly dissolved by the metal matrix rather than the residual metal "islands" left after the metal hydride composition. In these cases, the size of the hydrogen reservoir shrinks as it is limited to the metal matrix. Put differently, the volume fraction of metal-hydride in the metal-hydride metal composite may be no higher than the ratio of the solid solubility limit of hydrogen in the metal matrix and the molar fraction of hydrogen in the metal-hydride, reduced by a factor equal to the volume fraction of the matrix metal.

In addition, the metal matrix may already comprise hydrogen and, as described above, this, in effect, makes the hydrogen reservoir shallower. Therefore, the hydrogen released during decomposition of the metal hydrides may be limited to the metal matrix (as the metal "islands" do not exhibit appreciable solubility of hydrogen), which, in turn, may be less able to dissolve more hydrogen. To prevent hydrogen evolution, the volume fraction of metal hydride in the metal-hydride metal composite may be no higher than the ratio of: the difference between the solid solubility limit of hydrogen in the metal matrix and the average hydrogen molar concentration in the metal matrix, reduced by a multiplication factor equal to the volume fraction of the matrix metal; and the difference between the molar concentration of hydrogen in the metal-hydride particle and the average hydrogen molar concentration in the metal matrix.

The metal constituent in the metal hydride and metal matrix may also be an alloy. For example, the metal hydride comprises a zirconium alloy and the metal matrix comprises a titanium alloy.

In a specific example, the metal constituent in the metal-hydride may be zirconium and the metal constituent in the metal matrix may be titanium. The metal hydride may therefore be zirconium hydride with a stoichiometry $ZrH_x$, wherein x is between 1 and 4 inclusive, more preferably between 1 and 2 inclusive.

The metal hydride particles may comprise more than one different type of metal-hydride particles. For example, each of the metal hydride particles comprises a different metal constituent. Similarly, the metal matrix may also comprise more than one metal constituent.

In specific examples, the metal in the metal hydride particles may be, any one, or mixture of: zirconium, hafnium, yttrium, niobium, boron, vanadium, molybdenum, tantalum, tungsten and/or chromium.

In specific examples, the metal in the metal matrix may be, any one, or mixture of: iron, niobium, vanadium, boron, manganese, aluminium, copper, silicon, boron, nickel, hafnium, tantalum, titanium, chromium, molybdenum, tungsten and/or zirconium.

Preferably, but not necessarily, the minimum temperature of decomposition or dissolution of the metal hydrides is around 573K at a pressure of 500 MPa.

After the transient heating event, the neutron shielding may be allowed to cool to normal operating temperatures. At these temperatures, the neutron shielding may be operative to reversibly form the metal hydride particles that had decomposed. The volume change when the metal hydride particles reform may cause internal stress to form within the component. Therefore, the metal constituents in the composite may be selected judiciously to ensure that the fractional volume change during dissolution and/or formation of the hydrides is less than 10%.

A second aspect of the invention proposes a nuclear fusion reactor, which comprises the neutron shielding material described above.

During the operation of a nuclear fusion reactor, high energy neutrons are produced which can damage structural and functional components within the reactor system. The neutron shielding material may be arranged as a neutron shield to protect such components. In an example, the neutron shielding may be arranged around the toroidal field coil.

In an example, the nuclear fusion reactor may be a tokamak and, more specifically, a spherical tokamak. In the spherical tokamak, the ratio of the major and minor radii of the toroidal plasma-confining region, which is known as the aspect ratio, may be less than or equal to 2.5.

BRIEF DESCRIPTION OF THE FIGURES

Embodiments of the invention will now be described for the sake of example only with reference to the following drawings in which.

DETAIL DESCRIPTION OF THE EMBODIMENTS

Figure 1:
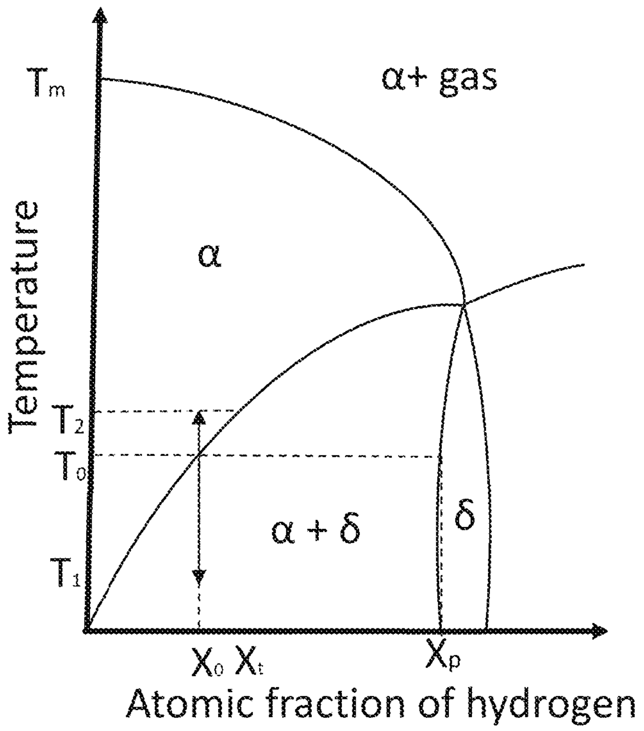
FIG. 1 is a schematic metal-hydrogen phase diagram.

Referring first to FIG. 1, the metal-rich end of a phase diagram for a notional metal-hydrogen system is shown. In general, a phase diagram shows which phase(s) occur or coexist at thermodynamic equilibrium for a given temperature and atomic fraction of hydrogen at constant pressure. In the phase diagram shown in FIG. 1, there are three phases: $\alpha$, $\delta$ and a gaseous phase. The $\alpha$ phase is a first metal containing dissolved hydrogen in solid solution. The $\delta$ phase is a metal hydride. The gas is hydrogen. In the regions which separate single-phase regions, a mixture of those phases coexist in equilibrium. In the phase diagram shown, all of the phases are solids. Generally, the equilibrium phases shown in the phase diagram are pressure dependent, but the dependence is relatively weak in solids. For a given temperature, $T_0$, the metal phase ($\alpha$) is able to dissolve up to a molar fraction $X_0$ of hydrogen in solid solution. $X_0$ is the solid solubility limit for hydrogen in the metal at this temperature. Below the solid solubility limit, hydrogen ions occupy interstitial sites in the host metal lattice. Above the solid solubility limit, the host metal lattice becomes super saturated with hydrogen and it becomes more thermodynamically favourable to form a metal hydride phase ($\delta$) at a composition $X_p$. The molar fraction of each of these phases is given by the "lever rule" as is known to the skilled reader. At larger concentrations of hydrogen, progressively more hydrogen rich metal hydride phases may form (for simplicity, only the metal-rich end is shown with a single hydride phase ($\delta$)). At sufficiently high hydrogen fractions, it may become more energetically favourable for hydrogen to form free hydrogen gas.

Some alloy systems exhibit a crystallographic phase transformation. For example, the metal phase ($\alpha$) may transform into another phase (e.g., a $\beta$ phase) with a different crystallographic structure. Such a phase transformation may also be associated with a corresponding increase or decrease in the solid solubility of hydrogen. Such a phase transformation would release or absorb energy depending on the metal species. For example, yttrium in the $YH_x$ based system exhibits an endothermic reaction when undergoing such a phase change.

Figure 2:
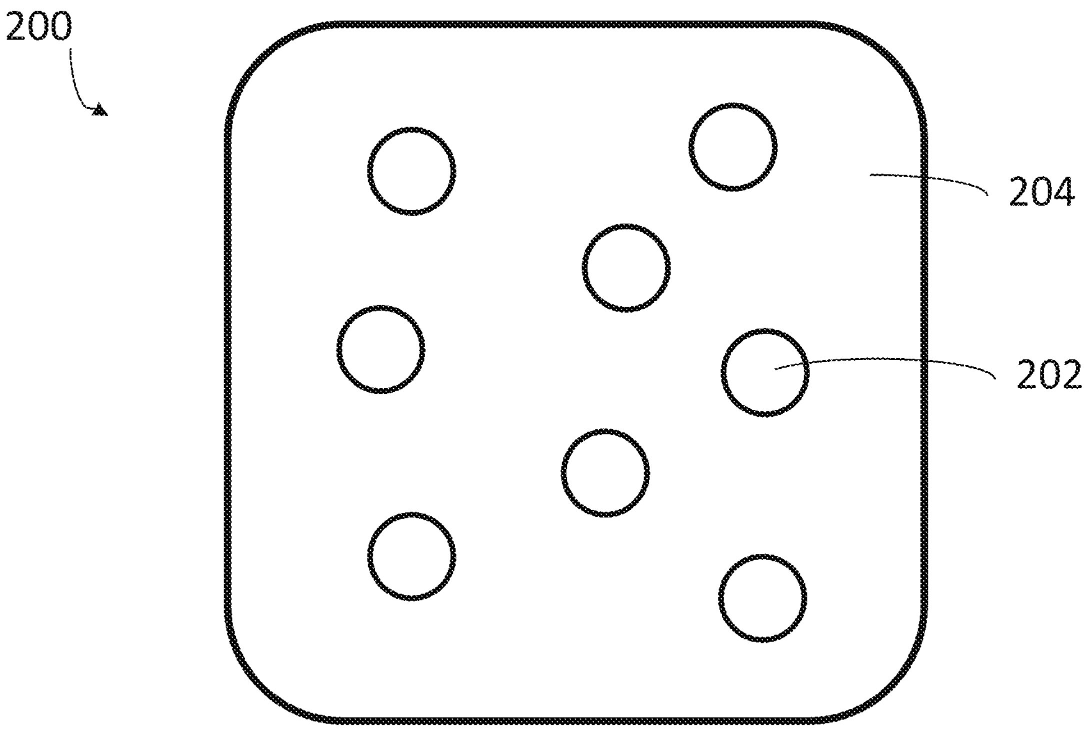
FIG. 2 is a schematic illustration of a metal hydride composite microstructure.

FIG. 2 shows a schematic microstructure of an alloy system 200 comprising a plurality of metal hydride precipitates 202 dispersed within a metal matrix 204. The metal matrix 204 may be an alloy. An alloy is a material, which comprises at least two different element constituents, typically referring to a mixture of metals. The metal-hydride phase may comprise a single metal hydride phase, or a mixture of metal hydride phases. The microstructure shown represents a metal-hydride metal composite structure. For example, a composite is a material which comprises at least two constituents (a metal and a metal hydride), which when combined, have different properties than those of the individual components. Herein, references to alloys and composites can be considered interchangeable.

Figure 3:
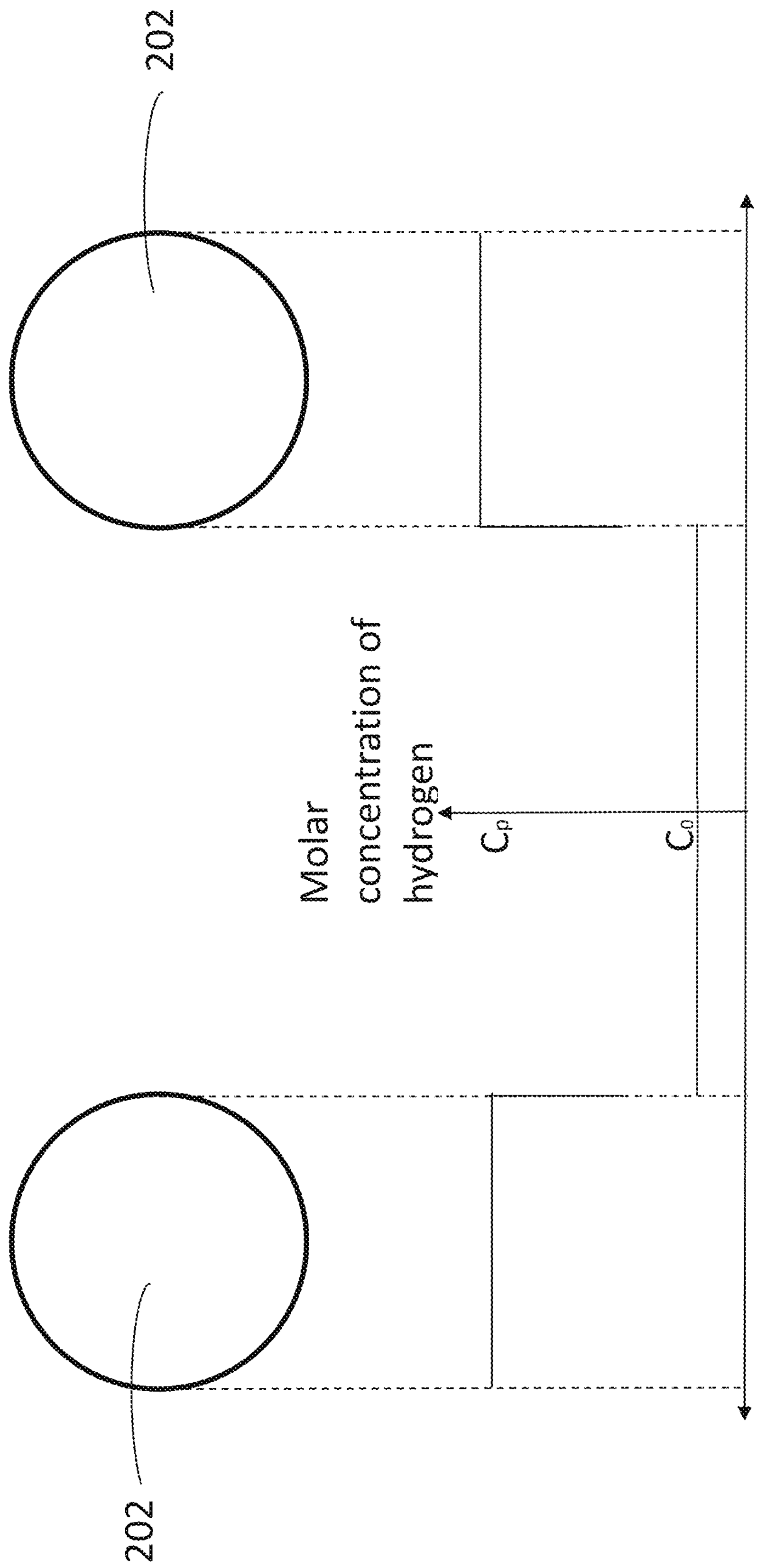
FIG. 3 is a schematic illustration of an exemplary hydrogen molar concentration profile between adjacent hydride precipitates before dissolution.

Turning to FIG. 3, an exemplary molar concentration profile of hydrogen is shown between two adjacent metal hydride precipitates 202. In FIG. 3, the molar concentration of hydrogen ($C_p$) in the hydride precipitates 202 is uniform. More generally, the molar concentration of hydrogen ($C_p$) in the hydride precipitates 202 may vary. If the hydride precipitate 202 comprises a single metal-hydride phase, then the variation in the molar concentration of hydrogen ($C_p$) in the hydride precipitate 202 is limited by the compositional range of that phase. FIG. 1 shows the compositional range (or "width" of a phase region) of the metal hydride phase (δ). The hydrogen atomic fraction in metal hydride phase (δ) may therefore vary between the maximum and minimum fractions defined by the compositional range. Metal hydrides are often stoichiometric and therefore the compositional range is typically narrow. In either case, the molar concentration of hydrogen ($C_p$) shown in FIG. 3 represents the mean molar concentration of hydrogen in the hydride precipitate 202. If the hydride precipitate 202 comprises a plurality of metal-hydride phases, then the molar concentration of hydrogen ($C_p$) may, in addition, vary between the different metal-hydride phases within the precipitate 202. As described above, the molar concentration of hydrogen ($C_p$) in each metal-hydride phase may, in turn, vary by an amount limited by the compositional range of that phase. In such cases, the molar concentration of hydrogen ($C_p$) shown in FIG. 3 represents the mean over the precipitate particles of the mean, over spatial positions within a given precipitate particle, of the molar concentration of hydrogen in the metal-hydride phases. To say this more simply, it is a mean over all spatial positions which are precipitate 202 of the molar concentration of hydrogen in the metal-hydride phases.

In FIG. 3, the molar concentration of hydrogen ($C_0$) in the metal matrix 204 is also uniform. More generally, the molar concentration in the metal matrix 204 may vary. If the metal matrix 204 comprises a single metal constituent, then the variation in the molar concentration of hydrogen ($C_0$) is limited by the solid solubility of hydrogen in the metal matrix. In these cases, the molar concentration of hydrogen ($C_0$) shown in FIG. 3 represents a mean concentration of hydrogen over spatial locations in the matrix. If the metal matrix 204 comprises a plurality of metal constituents, then the molar concentration of hydrogen ($C_0$) may, in addition, vary between the regions of the metal matrix that comprise different metal constituents. In such cases, the molar concentration of hydrogen ($C_0$) shown in FIG. 3 represents a mean over spatial positions in all regions of the metal matrix of the molar concentration of hydrogen at those spatial positions. Throughout the remainder of the specification, molar fraction and molar concentration will be used interchangeably when referring to the phase diagram and the concentration profile. As the skilled reader would appreciate, the molar fraction ($X_i$) and molar concentration ($C_i$) are directly proportional with one another and the conversion between these two units is trivial.

In an exemplary environment, the alloy system 200 may operate at a first temperature (i.e., a normal operating temperature) $T_1$ with transient heating events up to a second temperature $T_2$. Referring to FIG. 1, and considering the atomic fraction of hydrogen labelled $X_0$, at the first temperature $T_1$ the hydride precipitates 202 are stable (the molar fraction of hydrogen in the metal matrix 204 is greater than the solid solubility at the first temperature). However, during heating the temperature may rise above the critical temperature for this atomic fraction of hydrogen, $T_0$. Above the critical temperature, it becomes more energetically favourable for the hydride precipitates 202 to dissolve or dissociate. That is, the hydrides 202 are metastable and dissolve or dissociate because the solid solubility limit of hydrogen in the metal matrix 204 increases, and becomes greater than $X_0$ at higher temperatures. Herein, dissociate, dissolve or decompose may be used interchangeably; both terms refer to the metal hydride 202 separating into a metal constituent part and a hydrogen part. In the example shown, the solid solubility limit at the second temperature is $X_t$, and $X_t$ is greater than $X_0$. Put differently, above the critical temperature ($T_0$), the chemical potential of hydrogen in solid solution of the metal matrix 204 is lower than the chemical potential of hydrogen in the hydride precipitate 202. This difference between the chemical potential of hydrogen in different regions of the metal-hydride metal composite 200 generates a spatial variation in the chemical potential of hydrogen. The spatial variation in chemical potential of hydrogen within the microstructure, in turn, generates a net driving force, causing a net flux of hydrogen from the hydride precipitates 202 into the matrix 204. This process leads to dissolution of the metal-hydride precipitates 202. The dissolution of hydrogen precipitates may be governed by diffusion.

Figure 4:
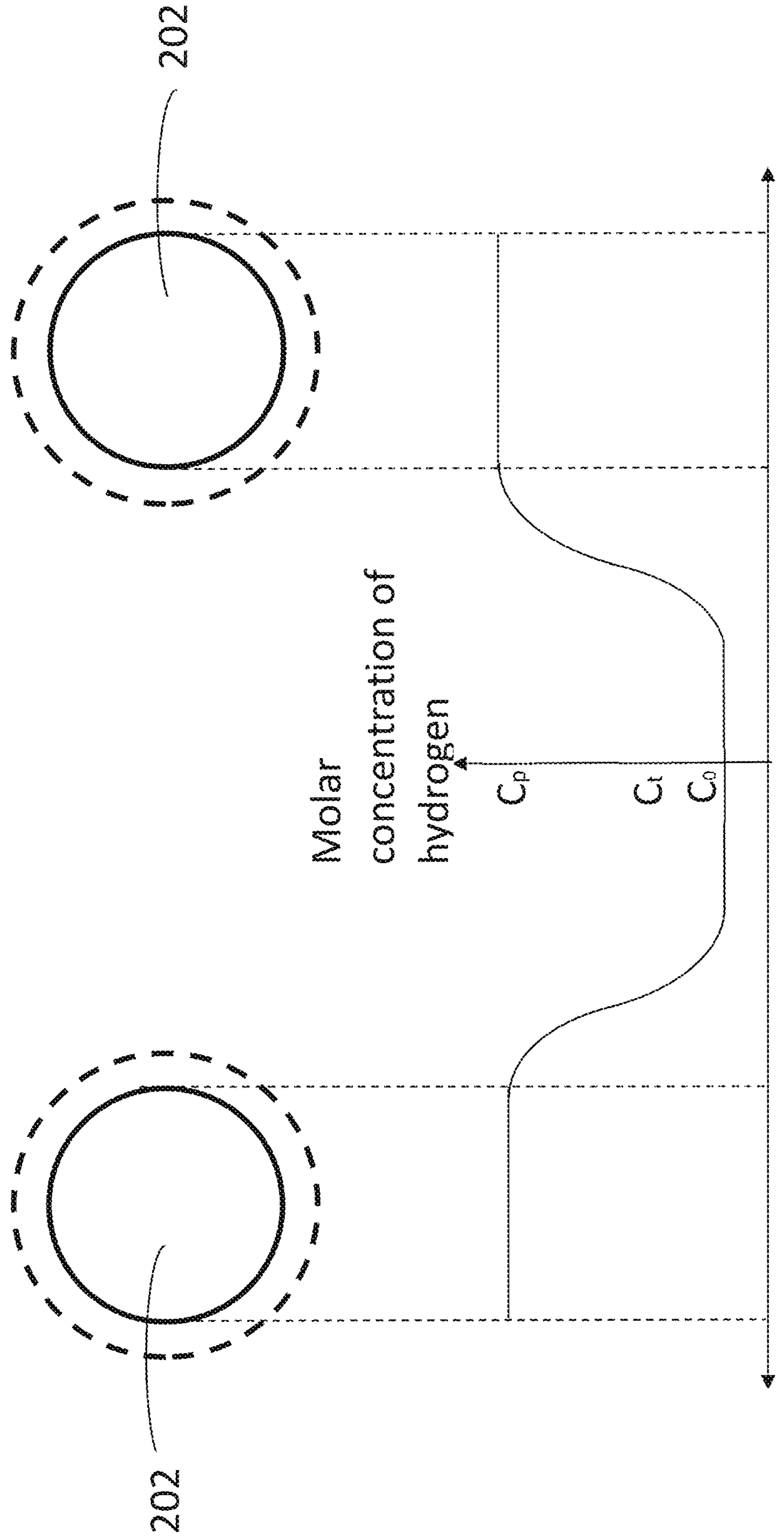
FIG. 4 is a schematic illustration of an exemplary hydrogen molar concentration profile between adjacent hydride precipitates after dissolution begins.

As described above, the spatial differential in chemical potential of hydrogen within the microstructure leads to a net flux of hydrogen from the hydride precipitate 202 to the matrix 204. Accordingly, diffusion leads to a reduction in the gradient of the hydrogen molar concentration profile with time. A possible molar concentration profile, after the hydride precipitate 202 has dissolved partially, is shown in FIG. 4. In regions in which the molar concentration is greater than the solid solubility limit $C_t$, there is a tendency for the hydride to re-precipitate out from solid solution. In these regions, the metal matrix 204 is supersaturated with hydrogen. Supersaturation occurs when the concentration of dissolved solute is greater than the solid solubility limit. At the same time, regions of the matrix immediately surrounding the new precipitates are below the solid solubility limit $C_t$ and correspondingly, there is a driving force for any newly precipitated hydride to dissolve once again. These conditions therefore represent a state of temporal local equilibrium, but not of global equilibrium, where there is a tendency for hydride precipitates 202 to dynamically precipitate and dissolve or dissociate. The global equilibrium is set by the phase diagram, which, referring to FIG. 1, is hydrogen dissolved in solid solution in the metal matrix 204.

In summary, in regions where hydrogen is supersaturated in the metal matrix 204, there is a tendency for hydrides to continuously form and dissolve. Such behaviour is a problem because precipitation of metal hydrides is often associated with a net volume change. The repeated precipitation and dissolution leads to embrittlement and possibly even produce microscopic or macroscopic fractures or pulverisation of the alloy. Preferably, therefore, random re-precipitation in the metal matrix 204 should be avoided. Instead hydrogen is engineered to re-precipitate at the original metal hydride precipitate sites 202. This can be achieved, for example, by varying the composition of the metal alloy in the hydride precipitate 202 compared to the metal alloy in the metal matrix 204, ensuring that they act as getters for hydrogen at temperatures below $T_0$. In a specific example, varying the composition of the metal alloy may comprise using a different metal constituent in the metal hydride precipitate 202 compared to the metal matrix 204.

The temperature margin for gas evolution in this composite can be engineered to be far higher than the temperature that the hydride alone decomposes. Coupled with this, the matrix (204) to precipitate (202) ratio can be tailored to ensure that no hydrogen gas is evolved under expected temperature excursions.

Neglecting kinetic effects, re-precipitation and hydrogen gas formation may be avoided if the molar concentration of hydrogen within the matrix 204 remains below the solid solubility limit ($X_t$) at the given operating temperature. During dissolution of a hydride precipitate 202, the hydrogen stored inside the precipitate is distributed throughout the alloy. In some embodiments, the hydride precipitates 202 are taken to comprise the same metal as the metal matrix 204. Applying conservation of hydrogen atoms before and after dissolution gives Equation 1.1.

$$2rX_p+X_0S=X_f(2r+S); \qquad \text{Equation 1.1:}$$

Where r is the effective radius of the hydride precipitate 202, S is the inner-separation between the hydride precipitates $X_p$ is the initial molar concentration of hydrogen in the hydride precipitates, and $X_f$ is the molar concentration of hydrogen in solid solution after dissolution. The left hand side represents the total hydrogen atoms before dissolution and the right hand side represents the total hydrogen atoms after.

In these embodiments, the metal constituent in the metal hydride is assumed to be the same as the metal constituent in the metal matrix 204 and therefore the solid solubility is taken to be the same ($X_t$) in these regions. Avoiding super saturation, neglecting any kinetic effects above, requires that the molar concentration of hydrogen in solid solution is less than the solid solubility. This gives equation 1.2.

$$X_f < X_t; \qquad \text{Equation 1.2}$$

$$X_t > \frac{2X_pr + X_0S}{2r+S}.$$

The volume fraction of hydride precipitate ($V_p$) and the matrix ($V_s$) are respectively given, as a first approximation, by $$\frac{2r}{2r+S} \text{ and } \frac{S}{2r+S},$$

which, for the two phase microstructure shown in FIG. 2, sum to one. Applying these relationships to the Equation 1.2, gives the inequality, as denoted in Equation 1.3.

$$V_p < \frac{X_t - X_0}{X_p - X_0}; \qquad \text{Equation 1.3}$$

Equation 1.3 states that if the volume fraction of the hydride precipitates is below a certain threshold then super saturation of hydrogen in the metal matrix 204 after dissolution can be avoided. The equation assumes that the hydride precipitates 202 are dispersed uniformly throughout the metal matrix 204. Therefore, without taking into account kinetic effects, this equation sets a maximum volume fraction of hydride precipitates to avoid hydrogen gas formation and/or re-precipitation. In such cases, upon dissolution of the hydride precipitates 202, the metal matrix 204 is operative to dissolve the volume of hydrogen released into solid solution of the metal matrix 204.

Optionally, all the parameters of Equations 1.1 to 1.3 may be measured at a temperature of 1273K and a pressure of 500 MPa. The volume fraction of metal-hydride in the metal-hydride metal composite (i.e. the combination of the metal matrix and the hydride precipitates) averaged over all positions in the metal composite, is preferably at least 1% at this temperature and pressure. The volume fraction of metal-hydride in the metal-hydride metal composite is no higher than $V_p$ in equation 1.3 that will induce hydrogen gas evolution at $T_0$ rather than hydrogen entering solid solution within 204. The molar fraction of metal-hydride in the metal-hydride metal composite may be at least 1 mol %.

The maximum volume fraction of hydride precipitates depends on:

- The difference between the solid solubility $X_t$ of hydrogen in the matrix 204 during a transient heating event and the initial molar concentration $X_0$ of hydrogen in the matrix 204;
- The difference between the initial molar concentration $X_0$ of hydrogen in the matrix 204 and the initial molar concentration $X_p$ of hydrogen in the hydride precipitates 202; and
- The relative size of these differences.

The solid solubility, at a given operating temperature, of hydrogen in the matrix 204 is determined largely by the chemical and physical interplay between the metal in the metal matrix and hydrogen. This is set by physical laws and given by the phase diagram. For any given alloy system, the phase diagram and therefore the solid solubility, initial molar concentration ($X_0$), and the molar concentration of hydrogen in the hydride precipitates ($X_p$) can be calculated for a given temperature and pressure using software packages such as CALPHAD (computer coupling of phase diagrams and thermochemistry). In many cases, thermophysical or thermochemical experiments are not necessary to calculate the phase diagram because the thermodynamic quantities (for example, enthalpy of mixing, formation energies, crystal structures) used as inputs into the CALPHAD model are known under standard pressure and temperature conditions and stored in the CALPHAD database. The solid solubility for a given temperature may be varied by changing different alloy system, but otherwise is largely uncontrollable. On the other hand, the initial molar concentration in the matrix 204 may be varied through processing of the alloy. As the hydride precipitates 202 that form are in thermodynamic equilibrium with the metal matrix 204 of the composite, the molar concentration of the hydride precipitates may correspondingly vary. However, depending on the stoichiometric of the metal hydride, this variation may be quite small. Referring again to FIG. 1, the compositional range for the δ is narrow.

In some embodiments, the alloy may be produced using conventional heat treatment processes. For example, in a conventional precipitation hardened alloy system, the initial molar concentration of hydrogen in the metal matrix 204 may be controlled by appropriate heat treatment. In some embodiments, the alloy is subject to a heat treatment in a hydrogen containing atmosphere. The hydrogen in the atmosphere dissociates on the surface of the metal, and then diffuses as atomic hydrogen into the alloy. The temperature of this heat treatment sets the solid solubility of hydrogen in the metal matrix 204. Typically, this initial heat treatment is referred to as a "solution" treatment. The heat treatment is limited in duration to avoid super saturation of the hydrogen and the generation of hydrides. Thereafter, the metal matrix 204 may comprise approximately a constant molar concentration of hydrogen, at a level below that of the solid solubility at the temperature of the heat treatment and below that of the molar concentration of hydrogen in the precipitates 202. The control of the molar concentration within the alloy may be controlled by appropriate control of the partial pressure of the hydrogen in the hydrogen containing atmosphere, and gas flow rate as is known to the skilled reader. In some cases, the alloy can then be cooled rapidly, or quenched, into the phase region where precipitation is energetically favourable. In some cases, the alloy is cooled to a lower temperature, at which the solid solubility of hydrogen is less than the molar concentration of hydrogen in the metal matrix 204. The hydrogen is therefore supersaturated and precipitation begins. Precipitation is governed by nucleation and growth. As is known to the skilled reader, the nucleation density may be controlled using "seeder particles", which act as efficient nucleation sites. During precipitation, hydrogen diffuses from the matrix 204 to the growing hydride precipitate. As such, in the locality immediately surrounding the precipitate, the molar concentration of hydrogen is locally depleted.

In some embodiments, the alloy may be produced by other methods. Such methods may be based on powder metallurgy and include additive manufacturing methods relating thereto. In powder metallurgy routes, the metal in the metal hydride precipitates 202 and the metal in the metal (alloy) matrix may vary. Each of these metals may, in addition, have very limited solid solubility in each other. Alternatively, the alloy composite may be made directly by a hydriding route, which is a known method to the skilled reader.

Suitable additive manufacturing techniques in accordance with the present disclosure include, for example, Fused Deposition Modeling (FDM), Selective Laser Sintering (SLS), 3D printing such as by inkjets and laserjets, Direct Selective Laser Sintering (DSLS), Electron Beam Sintering (EBS), Electron Beam Melting (EBM), Field Assisted Sintering Technique (FAST) also known as Spark Plasma Sintering (SPS), Laser Engineered Net Shaping (LENS), Electron Beam Additive Manufacturing (EBAM), Laser Net Shape Manufacturing (LNSM), Direct Metal Deposition (DMD), Digital Light Processing (DLP), Continuous Digital Light Processing (CDLP), Direct Selective Laser Melting (DSLM), Selective Laser Melting (SLM), Direct Metal Laser Melting (DMLM), Direct Metal Laser Sintering (DMLS), Material Jetting (MJ), NanoParticle Jetting (NPJ), and other known processes.

A shaped component or ingot of the composite may be produced by any combination of additive manufacturing and powder metallurgy steps herein disclosed. The composite may be then subject to a solution-precipitation heat treatment.

Figure 5:
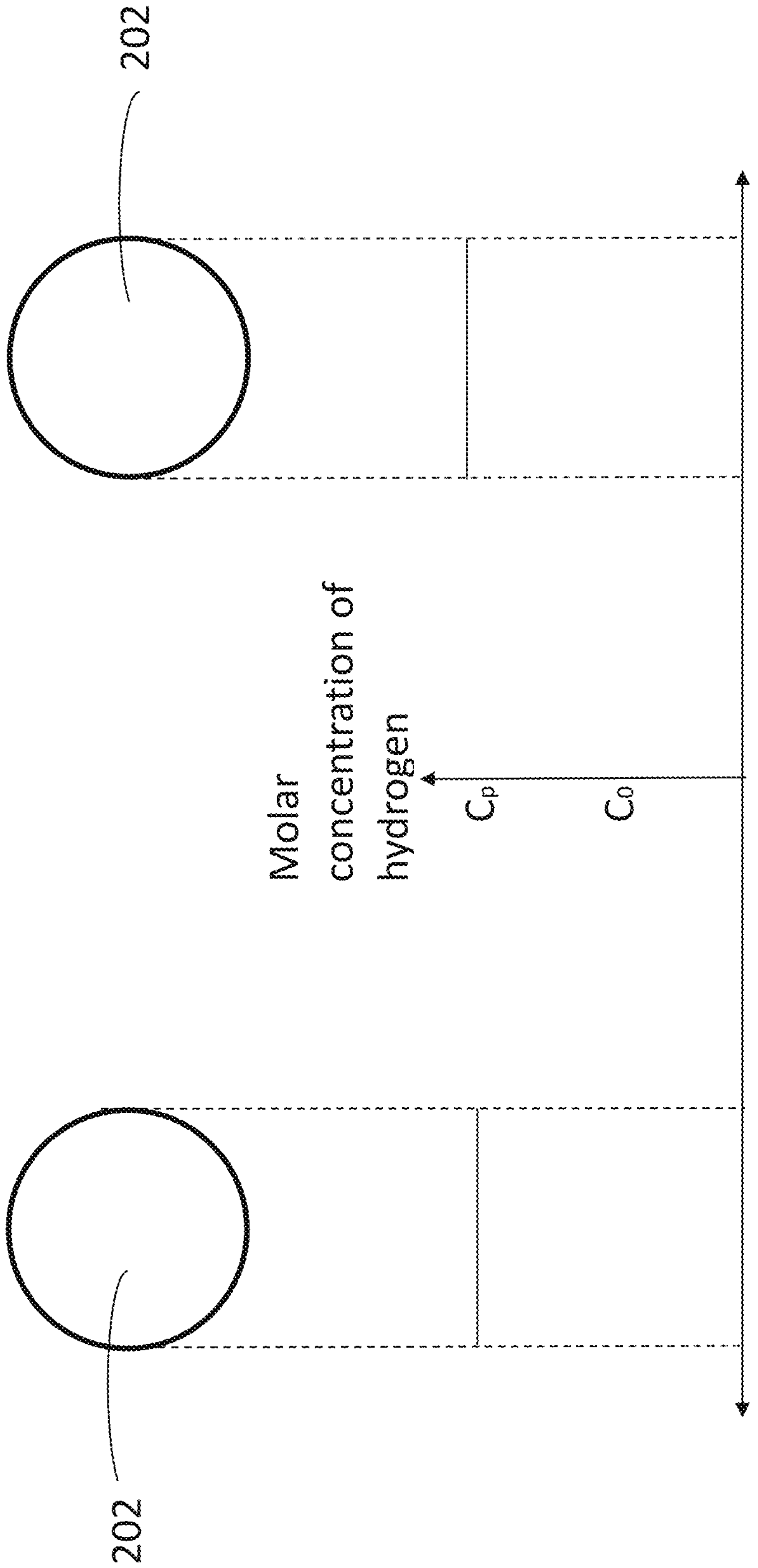
FIG. 5 is a schematic illustration of an exemplary hydrogen molar concentration profile between adjacent hydride precipitates manufactured using powder processing.

In powder metallurgy based manufacturing routes, the metal powder itself may be subject to a hydrogen containing atmosphere with regulated gas flow rate in a similar manner as described above. In this case, the metal hydride may be produced in its entirety through a single heat treatment. Alternatively, the powder may be subject to a heat treatment and quenched to cause precipitation. In either process, the metal powder is transformed into metal hydrides to form a metal hydride powder. The stoichiometry of the metal hydride may also be controlled by appropriate control of the partial pressure of the hydrogen containing atmosphere, gas flow rate and temperature. The metal hydride powder may then be intermixed with the metal powder and sintered and/or cold/hot pressed to generate the final component. After the cold/hot pressing and/or sintering process, the hydride metal powder particles correspond to hydride precipitates 202 in the metal matrix 204. The cold or hot pressing may be isostatic or uniaxial. The manufacturing process may include combining sintering and pressing stages sequentially or concurrently. Accordingly, the metal matrix 204 is not used as a "hydrogen reservoir" for the growth of the precipitates and therefore there may be only a negligible molar concentration of hydrogen between the hydride precipitates 202. FIG. 5 shows a schematic illustration of the hydrogen molar concentration profile between adjacent hydride precipitates generated using powder processing methods. Turning back to Equation 1.3, this corresponds to the case when $X_0$ is equal to, or very close to, zero. This therefore sets an upper bound for the maximum volume fraction of hydride precipitates, the dissolution of which can be tolerated without leading to super saturation of the metal matrix 204. In powder processing routes, the volume fraction of hydride precipitates may be controlled relatively easily because it correlates with the volume fraction of the metal hydride powder. Furthermore, the size and spatial distribution of powder particles can be controlled. The size of the powder particles may be in the range 0.1 μm to 500 μm.

In some embodiments, the metal constituent in the metal hydride differs from the metal constituent in the metal matrix 204. In such embodiments, there are at least two metal constituents in the alloy: a first metal constituent in the hydride 202 and a second metal constituent in the metal matrix 204. The binary phase diagram, as shown in FIG. 1, is thereby replaced with a ternary phase diagram. Preferably, the first metal constituent in the hydride 202 and the second metal constituent in the metal matrix 204 have very limited solid solubility in one another. This ensures that, after the transient thermal cycles described above occurs, a similar microstructure forms to that of the original microstructure before the thermal cycle. Powder processing is one method of manufacturing the microstructure as shown in FIG. 2. The first metal hydride powder may be formed by appropriate heat treatment of the first metal powder in a hydrogen atmosphere. The first metal hydride powder particles may then be intermixed with the second metal powder and sintered and/or cold/hot pressed to generate the alloy microstructure shown in FIG. 2. Conventional heat treatment manufacturing methods can be used to induce precipitation of secondary phases at temperatures much larger than the critical temperature, To, thus providing a temperature range in which the precipitates 202 can remain despite the desorption of their hydrogen into the matrix 204.

For a ternary component alloy, Equation 1.3 may no longer apply because the solid solubility of hydrogen in the first metal and in the second metal may be different. Therefore, more generally, the final molar concentration in the alloy after dissolution $X_f$ is replaced by a final molar concentration in the first metal constituent $X_{f1}$ and a final molar concentration in the second metal constituent $X_{f2}$. Considering the "worst case scenario", in which the molar concentration of hydrogen after dissolution in the first metal constituent is set to zero, then all the released hydrogen must be accommodated in the second metal constituent in the metal matrix 204. In such a scenario, the maximum tolerable volume fraction of hydride is reduced because the total volume in which hydrogen may be dissolved is reduced to only the metal matrix 204. The maximum volume fraction is reduced by a multiplication factor equal to the volume fraction of the metal matrix 204.

However, the use of a second metal constituent enables a degree of control over $X_t$ which in turn can lead to an increase in the maximum tolerable volume fraction of hydride precipitates. In a heat treated binary alloy, the solid solubility does not necessarily affect the maximum tolerable volume fraction of hydride precipitates because the hydride precipitates 202 are grown from the solute dissolved in the metal matrix 204 and therefore a larger solid solubility would mean that the initial concentration in the metal matrix 204 is higher. Rather, the difference in solid solubility with temperature is the main determining factor, as provided for in Equation 1.3. Conversely, in alloy systems made via powder processing routes (such as ternary alloys), the metal hydrides are not grown from solid solution and the second metal constituent may therefore be chosen to exhibit a large solid solubility of hydrogen. In the effect, the "reservoir" for accommodating hydrogen release during dissolution is made "deeper".

In a specific embodiment, the first metal constituent may be zirconium. The hydride may comprise a zirconium hydride, or a mixture relating thereto. The zirconium hydride may be stoichiometric and represented as $ZrH_x$, where x is between 1 and 4 inclusive, or preferably between 1 and 2 inclusive. The second metal constituent may comprise titanium.

In some embodiments, the plurality of metal hydride precipitates 202 may comprise one or more types of metal hydride precipitate 202. That is, a sub-set of the plurality of metal hydride precipitates 202 may comprise a different phase of metal hydride from the rest of the metal hydride precipitates, or equivalently a corresponding different metal constituent.

Example metal constituents for the metal hydrides 202 include: zirconium, hafnium, yttrium, niobium, boron, vanadium, molybdenum, tantalum, tungsten and chromium. The metal constituent in the metal hydrides 202 may be any one or a mixture of those listed above.

Preferably, but not necessarily, the metal hydrides are stable from dissolution up to at least 573K at a pressure of 500 MPa.

In some embodiments, each metal hydride precipitate 202 may comprise one or more metal constituents. Each metal hydride precipitate 202 may contain greater than 5% (by mole) of one or more elements in equimolar proportion. For example, the metal hydride may comprise a mixture of any of: zirconium, hafnium, yttrium, niobium, boron, vanadium, molybdenum, tantalum, tungsten and chromium.

In some embodiments, the metal matrix 204 may comprise one or more types of metal constituent. That is, the metal matrix 204 may comprise a mixture of multiple types of metal constituent (i.e. it is an alloy), or spatially separated phases. In such a case, the metal matrix 204 may be defined as regions of the alloy which are not hydrides.

Example metal constituents for the metal matrix 204 include combinations of those listed above plus: iron, niobium, nickel, hafnium, tantalum, titanium, chromium, molybdenum, tungsten, aluminium, manganese, copper, silicon, vanadium, boron or zirconium.

The volume fraction of the metal-hydride phase in the metal-hydride metal composite can be measured according to a number of well-characterised experimental techniques. Exemplary techniques include electron dispersive spectroscopy (EDS), wavelength dispersive spectroscopy (WDS), X-ray diffraction, mass spectrometry techniques and thermal gravimetric analysis.

In some embodiments, the composite is used as a shielding component for the high temperature superconductor cables in the toroidal field coil of a nuclear fusion reactor. In some embodiments, the alloy is used as a shielding component for low temperature superconductor cables in the poloidal field coil of a nuclear fusion reactor. During the nuclear fusion reaction, neutrons are produced and by virtue of their neutrality are not contained by the containment magnetic field. These neutrons possess extremely high energy (in the MeV range) and impinge on plasma facing components of the nuclear fusion pressure vessel causing damage. This is a problem because the damage may alter the properties of the high temperature superconductors over time, which complicates their operation.

The composite may also be used as a neutron moderating or neutron reflecting material in a small fission reactor as a compact, safe, and solid-state moderating material. For example, per unit volume, metal hydrides moderate neutrons more compared to liquid water, thus enabling smaller reactor core sizes.

The composite may also be included in an artificial satellite or space transport system, which requires shielding from solar radiation. Solar radiation may include neutrons and so the shielding may act as a neutron shield, as explained in detail below.

The damage caused by the neutrons in the shielded components will be reduced by neutron moderation especially when coupled with an efficient thermal neutron absorber e.g., boron or hafnium (either within the alloy itself as a constituent or combined with the composite component. There are two principal mechanisms for moderating neutrons: by elastic scattering and by inelastic scattering. Elastic scattering is more efficient for low Z elements, and inelastic scattering is more efficient for high Z elements. Hydrides, which contain hydrogen, may therefore be effective inelastic scattering centres.

In the alloy design shown in FIG. 2, the hydrides are dispersed within a metal matrix 204. A neutron incident on this alloy would therefore, on average, pass through a series of metal hydride and metal routes. The hydrides, which comprise hydrogen, under normal operation, are effective at moderating the neutrons to more optimal capture cross section energies. The microstructure as shown in FIG. 2 therefore acts an effective neutron moderator. Elements such as hafnium can also be incorporated into the alloy, which exhibit high thermal neutron cross section to further improve the neutron shielding properties.

The fusion reactor may be a tokamak, preferably a spherical tokamak. Preferably, but not necessarily, the aspect ratio of the spherical tokamak is less than or equal to 2.5. The aspect ratio is the ratio of the major and minor radii of the toroidal plasma-confining regions of the tokamak.

In a spherical tokamak, the regions within the central column, which comprise high temperature superconductors cabling, are very restricted in terms of space. Preferably, neutron shielding in these regions is as efficient as possible so that a minimal thickness of shielding is required. This is important because it ensures, out of the available space, that the cross-sectional area apportioned to the superconductor can be maximised. Increasing the cross-sectional area of the superconductors allows for higher current carrying capability and the generation of a larger containment magnetic field. In practice, the containment magnetic field may therefore set a minimum volume fraction of hydride required for effective shielding given the space available in the central column. Below such a threshold, the moderation of the neutrons would not be sufficient at the given design thickness of shielding and the high temperature superconductors might be damaged. In some embodiments, the minimum volume fraction of hydrides required for effective shielding in a fusion reactor is 5%. In some embodiments, the minimum fraction of hydrides required for effective shielding in a fusion reactor is greater than, or equal to, 5 mol %.

A secondary effect of inelastic scattering of neutron irradiation is heating. The heating can be considerable and hydrides present, which exhibit relatively low dissolution temperatures, may undergo dissolution. As outlined above, the dissolution of hydrides may lead to further precipitation and/or hydrogen release. Therefore, there exists an optimal working range for the volume fraction of hydride precipitates, which is set between: the maximum tolerable volume fraction of hydride precipitate, in which dissolution of may be accommodated without reprecipitation and/or release of hydrogen; and a minimum volume fraction of hydride precipitate required to ensure effective moderation, for the given thickness of shielding.

After a transient heating event, the temperature may decrease to temperatures in which precipitation of the hydride from solid solution is energetically favourable. In embodiments which use hydrides for a functional purpose, as described above, it is preferable that the microstructure after a transient heating event is substantially restored. That is to say, the hydride dissolution and subsequent reprecipitation, after cooling, is reversible. For example, this would ensure that the neutron shield for the high temperature superconductor remained an effective neutron shield during use and mitigate the safety challenge with potential hydrogen release under accident conditions.

In a binary alloy, in which the metal in the hydride and metal in the matrix 204 are compositionally or chemically the same, cyclic heating and cooling is likely to be irreversible. Put differently, for the microstructure to be restored in a reversible manner requires that the heating and cooling cycle during operation mimics the effect of the heat treatment during manufacture.

However, in a ternary composite, in which the hydride comprises a first metal constituent and the metal matrix 204 comprises a second, different, metal constituent, the process may be reversible. This is because during dissolution of the hydrides, the hydrogen, being comparatively smaller than the first metal, is able to diffuse out from the first metal constituent comprising the metal hydride 202 into solid solution in the second metal constituent comprising the metal matrix 204. On the other hand, because the dissolution temperature of hydrides is much lower than the melting point of metals, the first metal constituent diffuses much more slowly into the second metal constituent if designed appropriately, whereby there exists very limited solid solubility or limited potential for intermediate phases to form (should it be energetically favourable to do so). In some embodiments, the first metal or alloy constituent may be immiscible with the second metal constituent to avoid any intermixing. The first and second metals constituents may be alloys. In either case, once the hydrides dissolve, they leave behind "islands" of the first metal or alloy constituent, dispersed within the matrix 204, which correspondingly has an increased molar concentration of hydrogen in solid solution. Hydride precipitation may be configured to be unfavourable in the second metal or alloy constituent (by judicious choice of second metal or alloy constituent), then nucleation and growth of the hydride precipitates after cooling may be limited to the "islands" of the first metal or alloy constituent. Alternatively, precipitation in the second metal or alloy constituent may be avoided by sufficiently high solubility range hydrogen. In this way, the microstructure of the metal-hydride metal composite is operative to reversibly form during cyclic heating events above and below the dissolution temperature of the metal hydrides. Here, "reversibly" refers to the microstructure of the alloy system 200 returning substantially to its original structure, such that the mechanical and functional properties of the alloy system 200 are largely unaffected by the dissolution and re-precipitation of the metal-hydride particles 202. Accordingly, reversibility fatigue may occur and be used to mean that the change in mechanical (e.g., yield stress) and functional properties (e.g., moderating ratio) of the alloy 200 is less than 5%, more preferably less than 1%. An alloy based on the zirconium hydride-titanium metal-hydride metal composite may be particularly suited for this purpose.

Another source of irreversibility may be introduced if dissolution and/or precipitation is associated with a volume change. By way of analogy, just as water evaporates at a higher temperature at higher pressure, the temperature for dissolution of the metal hydride precipitates 202 and the temperature for precipitation of these metal hydride precipitates 202 varies as a function of initial internal stress immediately prior to the phase transformation. A corollary of this is that the temperature of dissolution and precipitation may differ due to the differences in initial internal stress state. This leads to a form of irreversibility in a heating and cooling cycle. A further effect of the internal stress is that it may lead to microscopic or macroscopic fractures and/or pulverisation.

A problem with only using a single metal constituent (a binary alloy) is that the formation and dissolution of metal hydrides 202 in the metal matrix 204 reaction is associated with a volume change and the volume change is not easily controllable. However, by using more than one metal constituent (a ternary alloy), judicious choice of the first metal constituent in the hydride and the second metal constituent in the metal matrix 204 may enable volume matching. For example, if dissolution of the metal hydride is associated with a volume decrease, the second metal may correspondingly increase to negate this volume decrease, or vice versa. The fractional volume change associated with dissolution and/or formation of the metal-hydride may therefore be engineered to be less than 10%.

The aforementioned sections provide a maximum tolerable volume fraction of hydrogen (or hydride) which may be accommodated in an alloy system without hydrogen formation and/or precipitation during hydride dissolution. These calculations were based on thermodynamic effects alone and neglected the kinetic effects of diffusion.

In practice, the kinetics of diffusion is important because it determines whether hydrogen formation may occur due a local "build up" of hydrogen around the dissolving hydride precipitate. Turning back to FIG. 4, the molar concentration profile of hydrogen in the metal matrix 204 in the vicinity of the dissolving metal hydrides 202 may be greater than the solid solubility limit. To avoid local precipitation and/or hydrogen formation, the time required for the hydrogen to diffuse down the molar concentration gradient into the metal matrix 204 is arranged to be less than the average time for nucleation of the hydride precipitates and/or hydrogen gas.

Generally, in a given period of time, a solute atom travels a distance approximately equal to $\sqrt{Dt}$, where D is the diffusion coefficient of the solute atom in the metal matrix 204, and t is the time of travel. The diffusion coefficient increases exponentially with increasing temperature. Accordingly, the volume of the metal matrix 204, which accommodates dissolution is reduced to a volume approximately equal to the surface area of the hydride precipitate multiplied by $\sqrt{Dt}$. Equation 1.3 may therefore represent an upper bound for the maximum tolerable volume fraction of hydride precipitates. Taking into account kinetic effects, the surface area of the hydride precipitate and the temperature (D increases exponentially with temperature) may determine whether supersaturation occurs. Furthermore, the shape of the hydride precipitate may be an important parameter because each shape may have a different surface area to volume ratio. As the surface area to volume ratio increases, a smaller volume of hydrogen is released and can be accommodated by a comparatively larger volume of metal matrix immediately surrounding the dissolving precipitate. Possible shapes of hydride precipitates are: rod, needle, sphere or plate.

In another embodiment of the invention, the metal-hydride metal composite alloy may comprise two or more metal constituents, in approximately equal molar fraction, from any of: Sc, Nb, Hf, Ta, Ti, Zr, Cr, Mo, Y, Mn, W, Fe, Ni, Al, Cu, Si, V and B. An alloy of this kind is referred to in the field as a high entropy alloy. The high entropy alloy may be body-centred-cubic. One or more of the metal constituents may form a metal hydride. Each of these metal hydrides may comprise one or more different hydride stoichiometries or relate to a mixture thereto. Furthermore, each of the metal hydrides may comprise a mixture of metal constituents, for example a mixture of zirconium, vanadium, chromium and yttrium. The number of phases in such a high entropy alloy may therefore be much larger than a ternary or binary alloy. The two or more metal constituents may also be in unequal molar proportion. For example, one of the metal constituents in the composite may exhibit a molar fraction of close to 100% with the other constituents making up the remainder.

By using a larger number of metal hydride phases, the dissolution temperature of each metal hydride may overlap to generate a dissolution temperature range. Therefore, during a given transient heating event, only a portion of the metal hydrides may dissociate or decompose at a given time. In this way, the volume of hydrogen stored in the metal hydrides may be released in stages from the dissolution of the lowest dissolution temperature metal hydride phases up to the dissolution of the highest dissolution temperature metal hydride. The total volume of hydrogen released, in a given time interval, therefore decreases. This may be advantageous because there is correspondingly a greater period of time for the hydrogen to diffuse within the metal matrix 204, which might prevent supersaturation in the metal matrix 204 caused by kinetic effects.

Many variations are possible within the scope of the invention, as will be clear to a skilled reader.

The invention claimed is:

1. A metal-hydride metal composite for use in a shield: the metal-hydride metal composite comprising:

a metal matrix; and a plurality of metal-hydride particles dispersed within the metal matrix;

wherein, the fraction of metal-hydride in the metal-hydride metal composite is at least 1 mol % and the volume fraction of metal-hydride in the metal-hydride metal composite, at a temperature below a minimum dissolution temperature of the metal-hydride particles, is no higher than the ratio of the solid solubility limit of hydrogen in the metal matrix and the molar fraction of hydrogen in the metal-hydride, said solid solubility limit being a molar fraction of hydrogen in the metal matrix and defined at 1273K and 500 MPa, whereby, in the event of dissolution, hydrogen released by the metal-hydride particles is dissolved into solid solution of the metal matrix and release of hydrogen gas is substantially prevented.

2. The metal-hydride metal composite according to claim 1, wherein the volume fraction of metal-hydride in the metal-hydride metal composite is no higher than the ratio of:

the difference between the solid solubility limit of hydrogen in the metal matrix and the average hydrogen molar concentration in the metal matrix; and the difference between the molar concentration of hydrogen in the metal-hydride particle and the average hydrogen molar concentration in the metal matrix.

3. The metal-hydride metal composite according to claim 1, wherein the fraction of metal hydride in the metal-hydride metal composite is greater than, or equal to, 5 mol %.

4. The metal-hydride metal composite according to claim 1, wherein the metal constituent in the plurality of metal hydride particles and metal matrix is the same.

5. The metal-hydride metal composite according to claim 1, wherein the metal constituent in the plurality of metal hydride particles and metal matrix is different.

6. The metal-hydride metal composite according to claim 5, wherein the volume fraction of metal-hydride in the metal-hydride metal composite is no higher than the ratio of the solid solubility limit of hydrogen in the metal matrix and the molar fraction of hydrogen in the metal-hydride, reduced by a multiplication factor equal to the volume fraction of the matrix metal.

7. The metal-hydride metal composite according to claim 5, wherein the volume fraction of metal hydride in the metal-hydride metal composite is no higher than the ratio of:

(i) the difference between the solid solubility limit of hydrogen in the metal matrix and the average hydrogen molar concentration in the metal matrix, reduced by a multiplication factor equal to the volume fraction of the matrix metal; and (ii) the difference between the molar concentration of hydrogen in the metal-hydride particle and the average hydrogen molar concentration in the metal matrix.

8. The metal-hydride metal composite according to claim 6, wherein the metal constituent in the metal-hydride is zirconium or a zirconium alloy and the metal constituent in the metal matrix is titanium or a titanium alloy.

9. The metal-hydride metal composite according to claim 1, wherein the plurality of metal-hydride particles comprises a plurality of types of metal-hydride particles, wherein each of the plurality of types of metal-hydride particle comprises a different metal constituent.

10. The metal-hydride metal composite according to claim 1, wherein the metal matrix comprises a plurality of types of metal constituent.

11. The metal-hydride metal composite according to claim 1, wherein the metal constituent in the plurality of metal hydride particles is any one, or mixture, of: zirconium, hafnium, yttrium, niobium, boron, vanadium, molybdenum, tantalum, tungsten and/or chromium.

12. The metal-hydride metal composite according to claim 1, wherein the metal constituent in the metal matrix is any one, or mixture, of: iron, niobium, vanadium, boron, manganese, yttrium, copper, silicon, nickel, hafnium, tantalum, titanium, chromium, tungsten and/or zirconium.

13. The metal-hydride metal composite according to claim 1, wherein the minimum temperature of dissolution of the plurality of metal-hydride particles is 573K at a pressure of 500 MPa.

14. The metal-hydride metal composite according to claim 1, wherein the fractional volume change of the metal-hydride metal composite associated with dissolution and/or formation of any of the metal-hydride is less than 10%.

15. A system comprising any one of the following:

(i) a fusion reactor;

(ii) a nuclear fission reactor;

(iii) an artificial satellite; or (iv) a space transport system, wherein, the system comprises a shielding, the shielding comprising a metal-hydride metal composite, wherein the metal-hydride metal composite comprises:

a metal matrix; and a plurality of metal-hydride particles dispersed within the metal matrix, and wherein, the fraction of metal-hydride in the metal-hydride metal composite is at least 1 mol % and the volume fraction of metal-hydride in the metal-hydride metal composite, at a temperature below a minimum dissolution temperature of the metal-hydride particles, is no higher than the ratio of the solid solubility limit of hydrogen in the metal matrix and the molar fraction of hydrogen in the metal-hydride, said solid solubility limit being a molar fraction of hydrogen in the metal matrix and being defined at 1273K and 500 MPa, whereby, in the event of dissolution, hydrogen released by the metal-hydride particles is dissolved into solid solution of the metal matrix and release of hydrogen gas is substantial prevented.

16. A system according to claim 15 being the fusion reactor, wherein the shielding is arranged around the toroidal field coil.

17. A system according to claim 16, wherein the fusion reactor is a tokamak, preferably a spherical tokamak, and more preferably a spherical tokamak having an aspect ratio of less than or equal to 2.5, the aspect ratio being defined as the ratio of the major and minor radii of a toroidal plasma-confining region of the tokamak.

18. A method of providing a shielding, the shielding comprising a metal-hydride metal composite, wherein the metal-hydride metal composite comprises a metal matrix; and a plurality of metal-hydride particles dispersed within the metal matrix, and wherein, the fraction of metal-hydride in the metal-hydride metal composite is at least 1 mol % and the volume fraction of metal-hydride in the metal-hydride metal composite, at a temperature below a minimum dissolution temperature of the metal-hydride particles, is no higher than the ratio of the solid solubility limit of hydrogen in the metal matrix and the molar fraction of hydrogen in the metal-hydride, said solid solubility limit being a molar fraction of hydrogen in the metal matrix and defined at 1273K and 500 MPa, whereby, in the event of dissolution, hydrogen released by the metal-hydride particles is dissolved into solid solution of the metal matrix and release of hydrogen gas is substantially prevented.

19. The method according to claim 18, wherein the providing is performed by a process selected from a group comprising:

a solution-precipitation heat treatment of an alloy ingot or shaped component;

a powder metallurgy manufacturing route, comprising:

sintering;

hot or cold isostatic pressing and sintering; or hot or cold uniaxial pressing and sintering;

an additive manufacturing route, comprising one or more of:

Fused Deposition Modeling (FDM);

Field Assisted Sintering Technique (FAST);

Spark Plasma Sintering (SPS);

Selective Laser Sintering (SLS);

3D inkjet and/or laserjet printing;

Direct Selective Laser Sintering (DSLS);

Electron Beam Sintering (EBS);

Electron Beam Melting (EBM);

Laser Engineered Net Shaping (LENS);

Electron Beam Additive Manufacturing (EBAM);

Laser Net Shape Manufacturing (LNSM);

Direct Metal Deposition (DMD);

Digital Light Processing (DLP);

Continuous Digital Light Processing (CDLP);

Direct Selective Laser Melting (DSLM);

Selective Laser Melting (SLM);

Direct Metal Laser Melting (DMLM);

Direct Metal Laser Sintering (DMLS);

Material Jetting (MJ); and/or

NanoParticle Jetting (NPJ).

20. The metal-hydride metal composite according to claim 7, wherein the metal constituent in the metal-hydride is zirconium or a zirconium alloy and the metal constituent in the metal matrix is titanium or a titanium alloy.

* * * * *